June 8, 1965 M. J. FINK 3,188,580
SYMMETRICAL SELF-BLOCKING OSCILLATOR WITH
SYMMETRICAL STARTING CIRCUIT
Filed Dec. 21, 1961
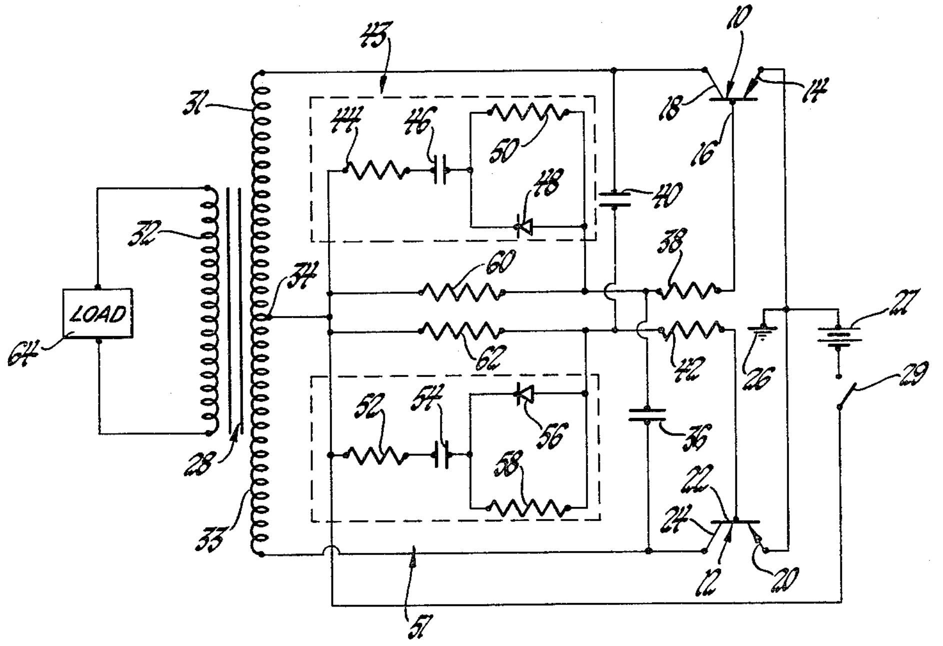
INVENTOR.
Marvin J. Fink
BY
Paul J. Ethington
ATTORNEY United States Patent Office 3,188,580
Patented June 8, 1965

3,188,580

SYMMETRICAL SELF-BLOCKING OSCILLATOR WITH SYMMETRICAL STARTING CIRCUIT

Marvin J. Fink, Flint, Mich., assignor to General Motors Corporation, Detroit, Mich., a corporation of Delaware Filed Dec. 21, 1961, Ser. No. 161,073
3 Claims. (Cl. 331—113)

This invention relates to high voltage power supply circuits and more particularly to a self-starting, self-quenching power supply circuit.

A transistor oscillator circuit is particularly adapted for developing a high alternating voltage from a low direct voltage source. However, in many applications such as when supplying an input to a voltage multiplying circuit, the load on the oscillator circuit is high during the starting operation and since the feedback current necessary to obtain maximum peak to peak amplitude of oscillatory voltage developed by the oscillator circuit is determined by the magnitude of the load circuit, means are required to provide high values of starting current. Furthermore, it is often desirable to intermittently quench the oscillatory operation of the circuit so as to decrease current drain on the direct voltage source.

In accordance with this invention, a power supply circuit is provided having high starting current so as to quickly obtain maximum peak to peak amplitude of oscillatory voltage developed by the circuit. This is accomplished with a magnetically coupled regenerative feedback oscillator circuit including a transistor having a starting circuit connected with it which initially presents low impedance. The oscillator is made self-quenching by providing an RC time constant network in the regenerative feedback circuit of the transistor so as to provide an output signal having a period of oscillations followed with a period of no-oscillations.

A more complete understanding of this invention may be had from the detailed description which follows taken with the accompanying drawing in which:

The single figure is a schematic diagram of a circuit embodying the invention.

Referring now to the figure there are shown two PNP type transistors 10 and 12. The transistor 10 comprises an emitter 14, a base 16 and a collector 18. The transistor 12 comprises an emitter 20, a base 22 and a collector 24. The emitters 14 and 20 are connected together in common to ground 26 and with the positive terminal of a battery 27. A saturable core transformer 28 is provided having wound thereon primary windings 31 and 33, separated with a center tap 34, and a secondary winding 32. The negative terminal of the battery 27 is connected with the collector 18 of the transistor 10 and the collector 24 of the transistor 12 via a switch 29, the center tap 34 and the primary windings 31 and 33, respectively. A load 64 is connected across the secondary winding 32.

A regenerative feedback circuit for the transistor 10 is provided and includes the primary winding 33 and an RC time constant network including a capacitor 36 and a resistor 38 connected together in series with the base 16 of the transistor 10. A regenerative feedback circuit is also provided for the transistor 12 and includes the primary winding 31 and an RC time constant network including a capacitor 40 and a resistor 42 connected together in series with the base 22 of the transistor 12. The capacitor 36 is provided with a discharge circuit including a resistor 60, the primary winding 33 is parallel with a series connected circuit including the switch 29, the battery 27 and the emitter 20 to collector 24 of the transistor 12. The capacitor 40 is provided with a discharge circuit including a resistor 62, the primary winding 33 in parallel with a series connected circuit including the switch 29, the battery 27 and the emitter 14 to collector 18 of the transistor 10. The values of the resistors and capacitors in the regenerative feedback circuits and the capacitor discharge circuits are chosen so that the feedback circuits have shorter time constants than the discharge circuits. The values of the time constants of the regenerative feedback circuits determine the duration of output pulses of the oscillator circuit and the values of the time constants of the discharge circuits for capacitors 36 and 40 when both transistors 10 and 12 are non-conductive determine the repetition rate of the oscillatory operation, as is explained hereinafter in the description of operation.

A starting network 43 for the transistor 10 is connected between the negative terminal of the battery 27 and the resistor 38 and includes a resistor 44 and a capacitor 46 connected together in series with a crystal diode 48 connected in parallel with a resistor 50. A starting network 51 is also provided for the transistor 12 and is connected in series between the negative terminal of the battery 27 and the resistor 42 and includes a resistor 52 and a capacitor 54 connected together in series with a crystal diode 56 connected in parallel with a resistor 58.

The values of the diodes 48 and 56 are chosen so as to exhibit low forward resistance and high reverse impedance. The values of resistors 44 and capacitor 46 in the starting circuit 43 and the resistor 52 and capacitor 54 in the starting circuit 51 are chosen so as to provide in combination with the forward resistances of diodes 48 and 56, respectively, starting networks having initially low impedances. The starting networks 43 and 51 have RC time constants whereby maximum peak to peak amplitude of oscillatory voltage developed by the power supply is obtained in approximately one fifth the time without the starting networks. The values of resistors 50 and 58 are chosen so as to provide in combination with capacitor 46, resistor 44 and resistor 60 and capacitor 54, resistor 52 and resistor 62, respectively, long RC time constants for discharging capacitors 46 and 54, respectively, and which time constants are of longer duration than the RC time constants of the capacitor discharge circuits for the capacitors 36 and 40, respectively, when both transistors 10 and 12 are non-conductive.

When the switch 29 is closed, potential from the battery 27 is applied to the oscillator circuit and starting current will flow in the starting networks of transistors 10 and 12. Starting current will flow from the positive terminal of the battery 27 from emitter 14 to base 16 of the transistor 10 through the resistor 38, the diode 48, the capacitor 46, the resistor 44, the switch 29 and back to the negative terminal of the battery 27. In a similar manner, starting current will flow from the positive terminal of the battery 27 from emitter 20 to base 22 of the transistor 12 through the resistor 42, the diode 56, the capacitor 54, the resistor 52, the switch 29 and back to the negative terminal of the battery 27. After the expiration of the transient period, virtually an open circuit will be presented by the networks 43 and 51 since the capacitor 46 and 54 will be charged, and hence block D.-C. current flow from the source 27 to the bases 16 and 22 of the transistors 10 and 12, respectively. The capacitors 46 and 54 will slowly discharge through the long RC time constant capacitor discharge circuits including the resistor 50, the resistor 60, and the resistor 44 and the resistor 58, the resistor 62 and the resistor 52, respectively.

Since starting current flows in the low resistance direction of each transistor, i.e., from the emitter to base, the impedance between the emitter to collector of each transistor will be effectively decreased so as to permit current flow in the output circuit of each transistor. Assuming that the oscillator circuit is asymmetrical, i.e., that one or the other of the transistors 10 and 12 will initially be more conductive than the other, and that initially transistor 10 is more conductive than transistor 12, it is seen that current will flow from the positive terminal of the battery 27 from the emitter 14 to collector 18 of the transistor 10, through the primary winding 31 producing core flux in the transformer core 28, which in turn causes a voltage to be induced in the primary winding 33 of a polarity such that the lower terminal of the primary winding 33 is negative with respect to the upper terminal of the primary winding 31. The positive potential existing on the upper terminal of the primary winding 31 will be applied in degenerative feedback fashion to the base 22 of the transistor 12 via the capacitor 40 and the resistor 42 so as to drive the transistor 12 into cutoff. The negative potential existing on the lower terminal of primary winding 33 will be applied in regenerative feedback fashion to the base 16 of the transistor 10 via the capacitor 36 and the resistor 38 so as to maintain the transistor 10 forward biased. This feedback action will continue until such time as either the transformer 28 saturates or that the value of collector current of transistor 10 becomes that of collector saturation current.

The transistors 10 and 12 are to be operated between fully on and fully off conditions. If the saturable core transformer 28 saturates below the value of collector saturation current of transistor 10, then at saturation of the transformer core 28 the voltage induced in the primary winding 33 will suddenly drop to zero. The flux level in the transformer core 28 will drop to its residual value thereby inducing a slight voltage in the primary winding 33 which will be of a polarity to apply a positive voltage to the base 16 driving the transistor 10 into cut-off. At the same time, a slight regenerative feedback voltage will be induced in the primary winding 31 of a polarity to apply a negative voltage to the base 22 permitting the transistor 12 to conduct. The transistor 12 will continue to conduct until the transformer core 28 saturates at which time the cycle will begin anew. In a similar manner to the above, the transistor 10 might have saturated at a lower value of collector saturation current than the transformer core 28, thus resulting in a decrease in regenerative feedback to the base 16 of the transistor 10 and eventually reverse biasing transistor 10 with a resulting forward biasing of transistor 12.

During the running mode of operation and considering only the operation of the transistor 10 when it is conducting the capacitor 36 will charge through the circuit including the primary winding 33, the switch 29, the battery 27, from the emitter 14 to base 16 of the transistor 10, and the resistor 38 to the other side of the capacitor 36. When the transistor 10 is in a non-conductive state and the transistor 12 is conductive the capacitor 36 will discharge through the resistor 60, the primary winding 33 and through the switch 29, the battery 27 and from the emitter 20 to collector 24 of the transistor 12 to the other side of the capacitor 36. Since as described hereinbefore the time constant of the charging path of the capacitor 36 is chosen so as to be shorter than that of the discharge path, the capacitor 36 will receive a net charge during each cycle of operation until the charge is sufficient to reverse bias the transistor 10. In an identical manner, the capacitor 40 charges during the period in which transistor 12 is conductive and after a number of cycles is sufficient to reverse bias the transistor 12. During this period, i.e., when the transistors 10 and 12 are both reverse biased and non-conductive, the capacitor 36 will discharge through the series path including the resistor 60 and the primary winding 33 to the other side of the capacitor 36 and the capacitor 40 will discharge through the series path including the resistor 62 and the primary winding 31 to the other side of the capacitor 40. The capacitors 36 and 40 will continue to discharge until the voltages existing across the capacitors are insufficient to reverse bias the transistors 10 and 12, respectively, at which time voltage from the battery 27 will be sufficient to provide forward bias potential to the base 16 of the transistor 10 and to the base 22 of the transistor 12 via the respective paths including resistors 60 and 38 and resistors 62 and 42. Since the time constants of the capacitor discharge circuits for capacitors 46 and 54 are longer than that of the capacitor discharge circuits for capacitors 36 and 40 when both transistors 10 and 12 are non-conductive as described hereinbefore, the transistors 10 and 12 will not draw large amounts of current through the starting networks 43 and 51, respectively, upon return to oscillatory operation. Thus an oscillatory voltage will be applied to the load 64 due to the switching operation of transistors 10 and 12 for a period as determined by the time for capacitors 36 and 40 to become sufficiently charged so as to reverse bias the transistors, and thereafter a period of no oscillations as determined by the time for the capacitors to discharge below the value of the battery 27.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claims.

I claim:

1. A circuit for supplying a relatively high voltage to an initially low impedance load comprising a source of relatively low voltage, a symmetrical self-locking oscillator comprising a pair of transistors each having input, output and common electrodes, a transformer having a pair of primary windings and a secondary winding, said load being connected across said secondary winding, means connecting one of said primary windings across said source through the common and output electrodes of one of said transistors, means connecting the other of said primary windings across said source through the common and output electrodes of the other of said transistors, the input electrode of each of said transistors being connected through a resistor and a capacitor to the output electrode of the other of said transistors to provide a regenerative feedback circuit, a discharge circuit for each of said capacitors having a larger time constant than the time constant of the feedback circuit, a starter circuit including a capacitor and a serially connected unidirectional conducting element providing an initially low impedance to current flow through the junction between the input and common electrodes of said transistors.

2. A circuit for supplying a relatively high voltage to an initially low impedance load comprising a source of relatively low voltage, a symmetrical self-blocking oscillator comprising a pair of transistors each having emitter, collector and base electrodes, a transformer having a primary and a secondary winding, said load being connected across said secondary winding, the emitter electrodes of each of said transistors being connected to one terminal of said source, the other terminal of said source being connected to a center tap on said primary winding, the collector electrodes of said transistors being connected to opposite end terminals of said primary winding, a capacitor and a resistor connecting the collector electrode of each of said transistors to the base electrode of the other of said transistors to provide a regenerative feedback circuit, a discharge resistor connecting the capacitor in each of the feedback circuits to said other terminal of said source to provide a discharge path for the capacitor having a longer time constant than the time constant in the feedback circuit, a starting circuit including a capacitor and a unidirectional conducting element connected in series with the emitter and base electrodes of each of said transistors to provide an initially low impedance to current flow through the emitter base junction of each of said transistors.

3. A circuit for supplying a relatively high voltage to an initially low impedance load comprising a source of relatively low voltage, a symmetrical self-blocking oscillator comprising a pair of transistors each having emitter, collector and base electrodes, a transformer having a primary and a secondary winding, said load being connected across said secondary winding, the emitter electrodes of each of said transistors being connected to one terminal of said source, the other terminal of said source being connected to a center tap on said primary winding, the collector electrodes of each of said transistors being connected to opposite end terminals of said primary winding, a capacitor and a resistor connecting the collector electrode of each of said transistors to the base electrode of the other of said transistors, discharge resistors connecting the capacitors in each of said feedback circuits to said other terminal of said source to provide a discharge circuit for the capacitors having a higher time constant than the time constant in the feedback circuit, a starting circuit for each of said transistors connected across the discharge resistors and including a capacitor connected in series with the parallel combination of a resistor and a diode to provide an initially low impedance to current flow through the emitter base junction of each of said transistors.

References Cited by the Examiner

UNITED STATES PATENTS

| | | | |
|---|---|---|---|
| 2,895,081 | 7/59 | Crownover et al. ---- | 331—108 X |
| 3,070,759 | 12/62 | Brouwer -------------- | 331—113 |

ROY LAKE, *Primary Examiner.*

JOHN KOMINSKI, *Examiner.*